(12) United States Patent
Diemer et al.

(10) Patent No.: US 6,622,842 B2
(45) Date of Patent: Sep. 23, 2003

(54) CLUTCH DISK

(75) Inventors: Matthias Diemer, Niederwerrn (DE); Andreas Orlamünder, Schweinfurt (DE); Andreas Dau, Schweinfurt (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/919,156

(22) Filed: Jul. 31, 2001

(65) Prior Publication Data

US 2002/0020598 A1 Feb. 21, 2002

(30) Foreign Application Priority Data

Aug. 3, 2000 (DE) .......................................... 100 37 898

(51) Int. Cl.[7] .............................................. F16D 13/68
(52) U.S. Cl. ................ 192/70.17; 192/107 R; 464/66; 464/68
(58) Field of Search ........................ 192/70.17, 107 R, 192/30 V, 207, 213.1, 212–214.1; 464/66, 68

(56) References Cited

U.S. PATENT DOCUMENTS

| | | | | |
|---|---|---|---|---|
| 3,280,949 A | * | 10/1966 | Ross ....................... | 192/107 R |
| 4,789,375 A | * | 12/1988 | Bassett ........................ | 464/68 |
| 5,135,094 A | * | 8/1992 | de Briel et al. ......... | 192/107 R |
| 5,167,312 A | * | 12/1992 | de Briel et al. ......... | 192/107 R |
| 5,884,740 A | * | 3/1999 | Sudau et al. ............. | 192/70.17 |

\* cited by examiner

*Primary Examiner*—Richard M. Lorence
*Assistant Examiner*—David D. Le
(74) *Attorney, Agent, or Firm*—Cohen, Pontani, Lieberman & Pavane

(57) ABSTRACT

A clutch disk including a hub area and a plurality of friction lining elements carried on the hub area, which are arranged in sequence around the circumference relative to the clutch disk rotational axis, and provide at least part of the friction surface area, where the friction lining elements are designed to make frictional contact with the associated opposing friction surface of a flywheel, a pressure plate, or the like. At least one friction lining element is carried on the hub area with freedom to shift position essentially in the circumferential direction relative to the rotational axis.

16 Claims, 8 Drawing Sheets

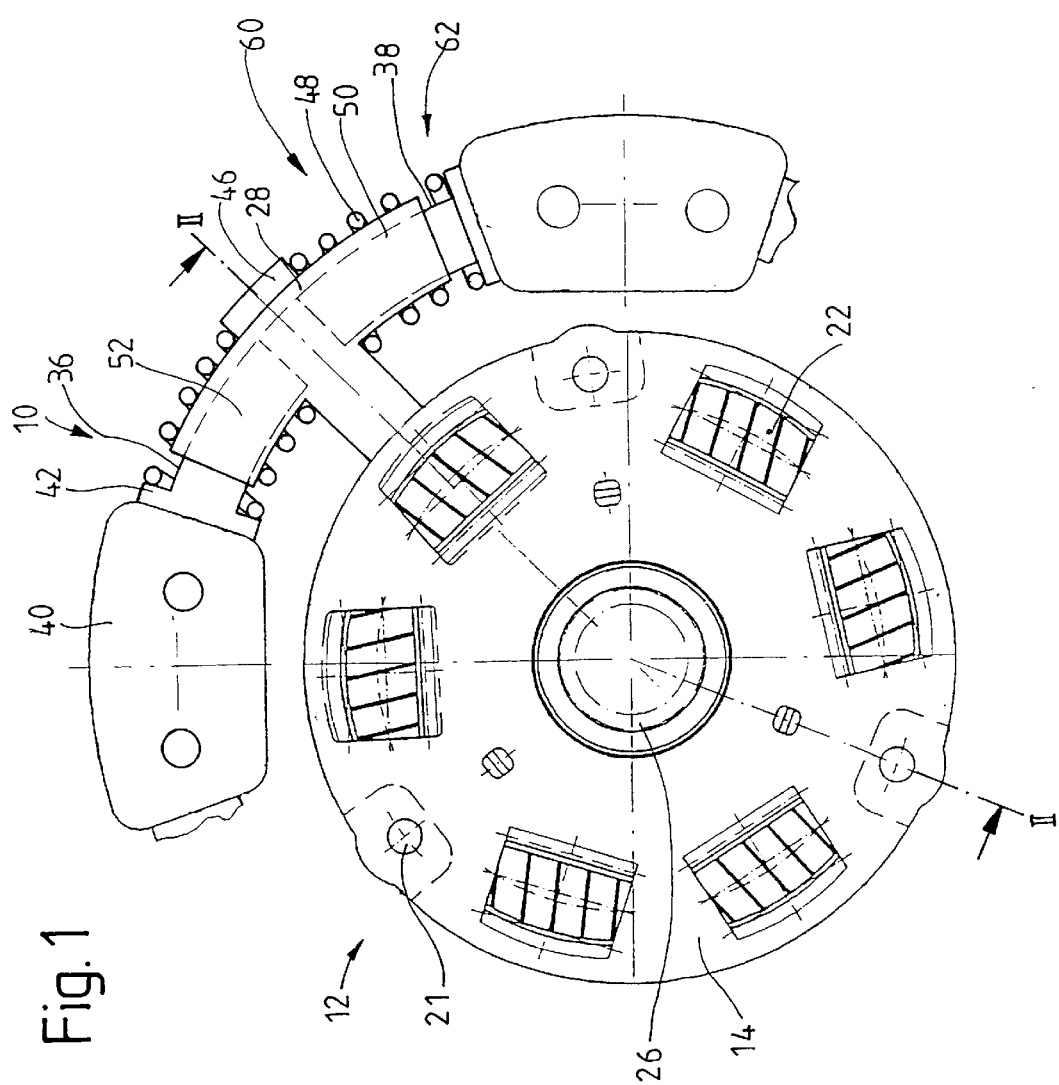

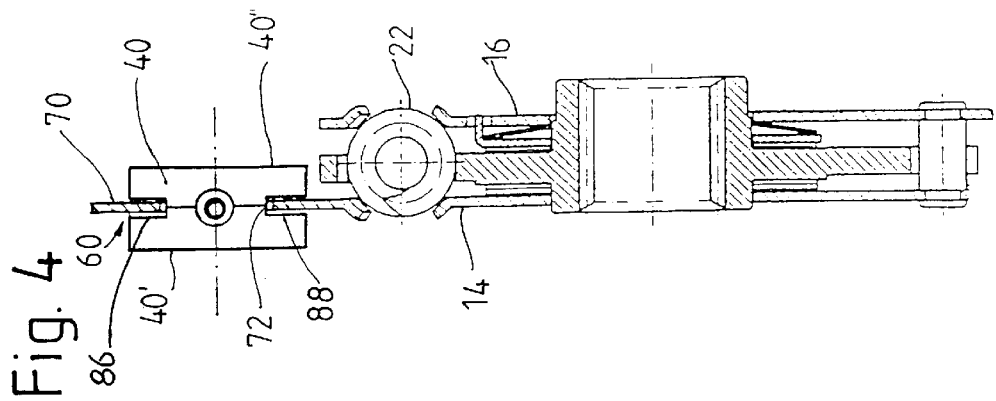
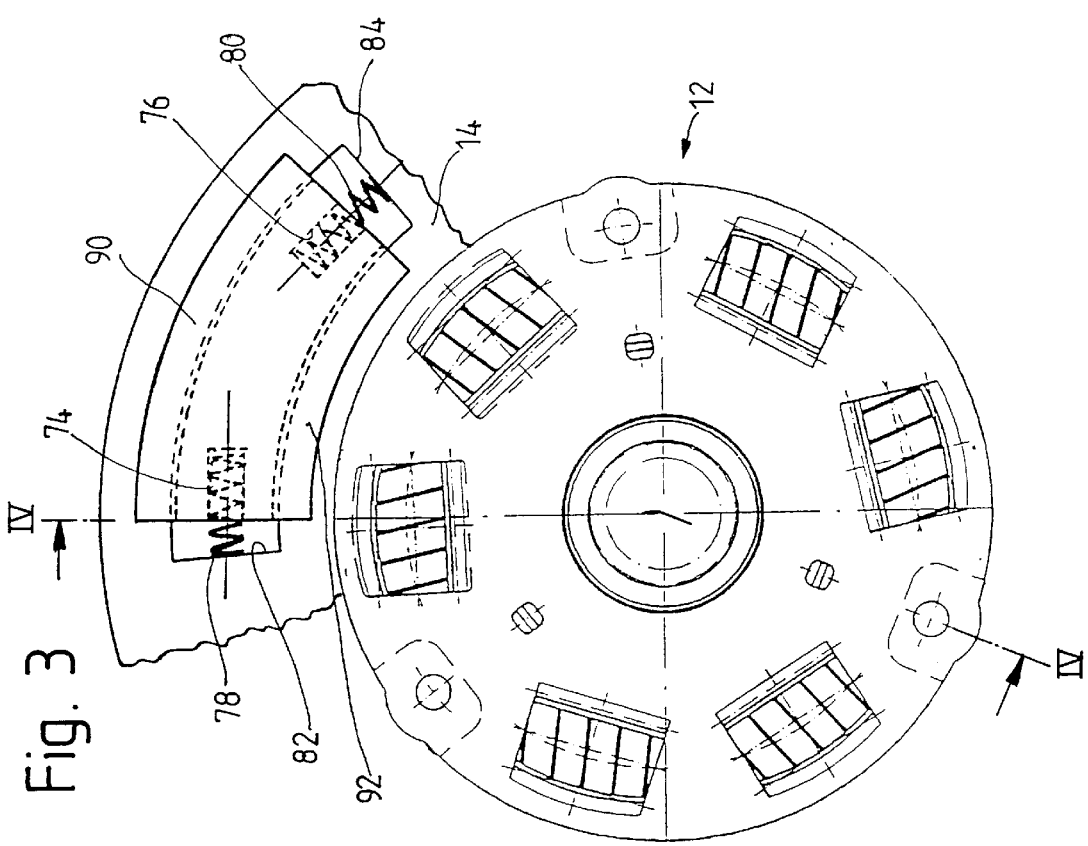

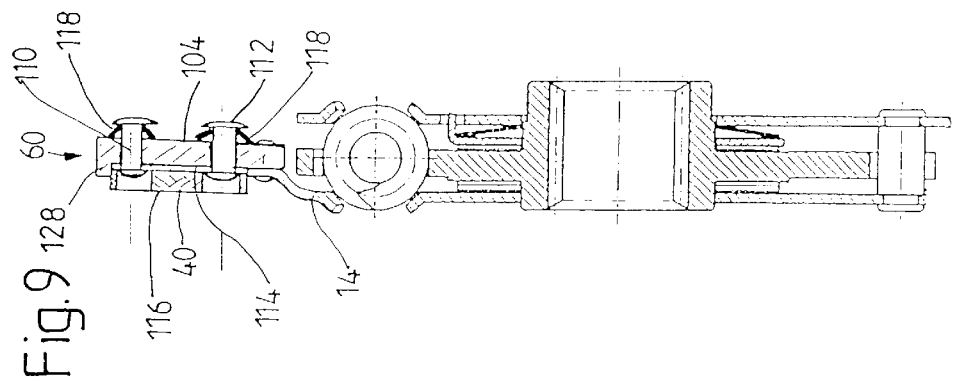
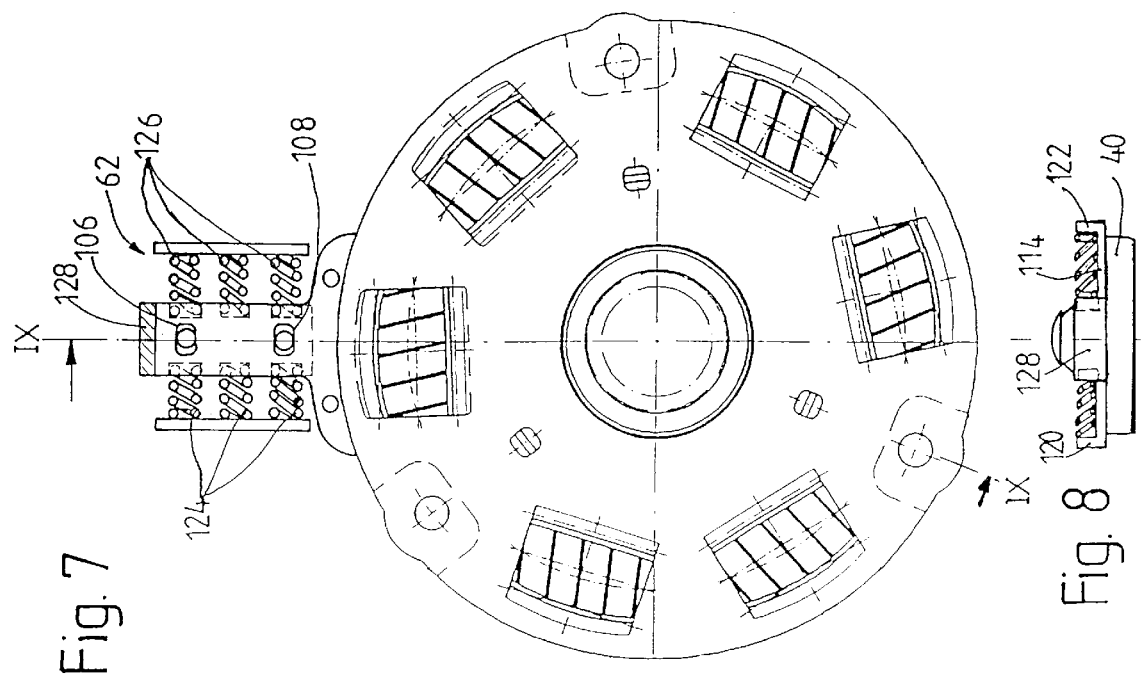

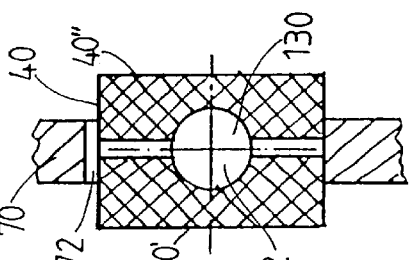
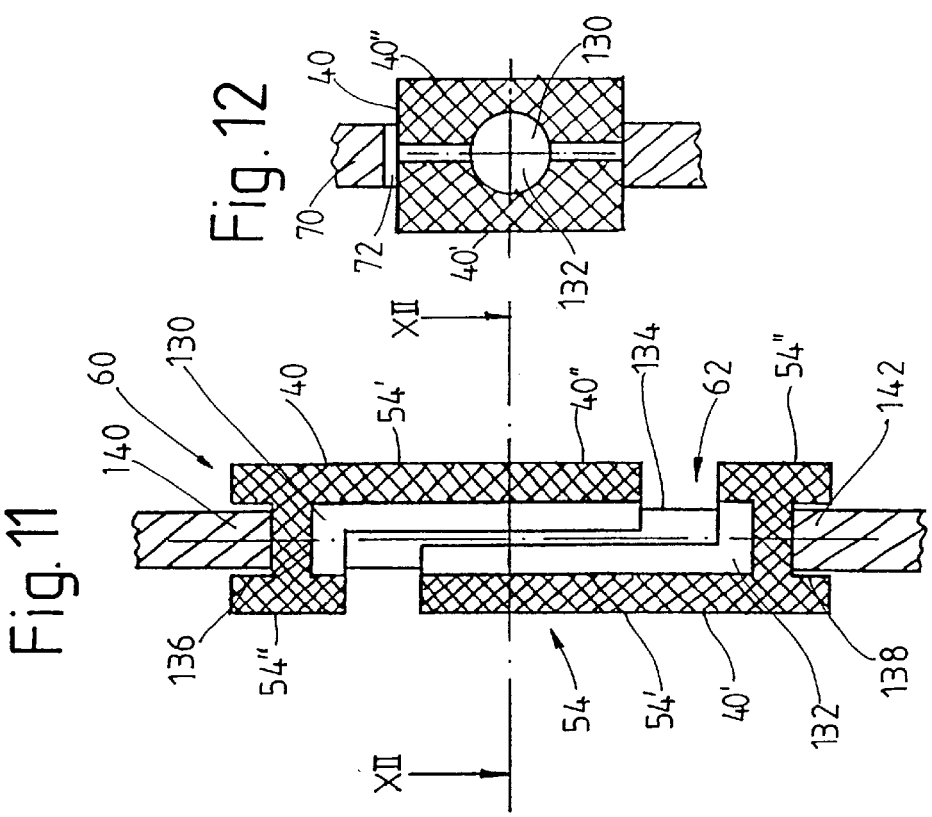
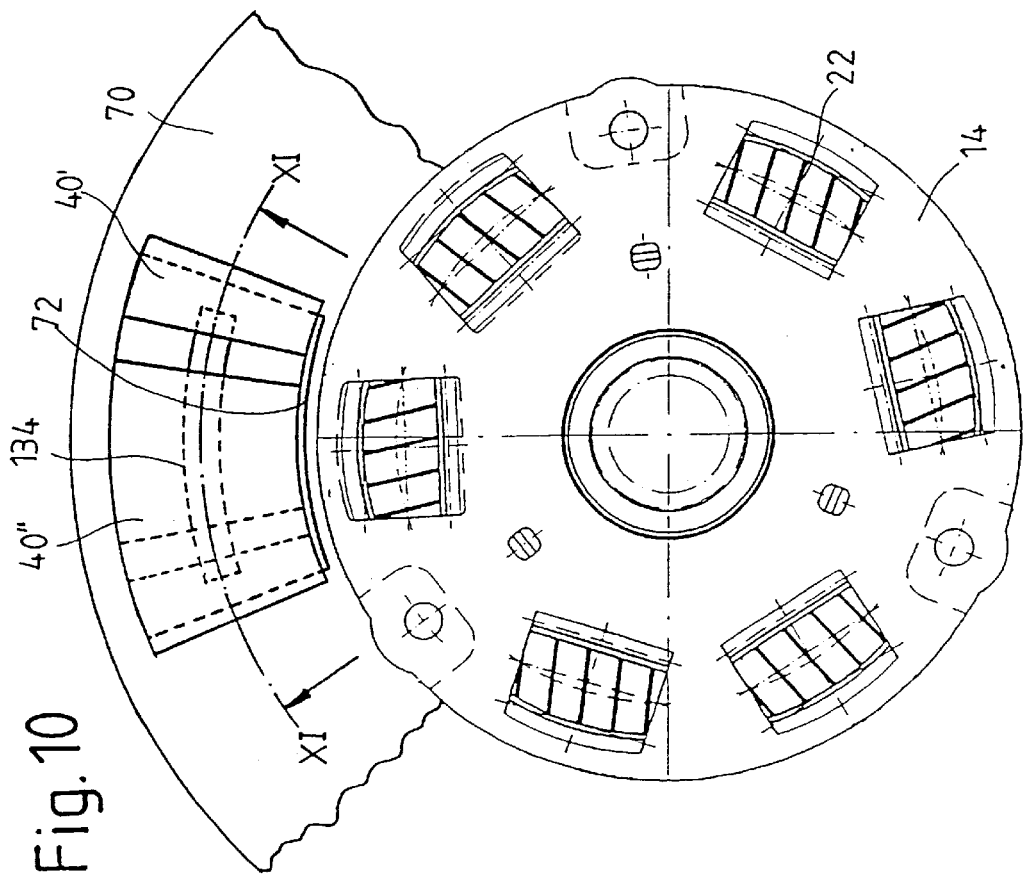

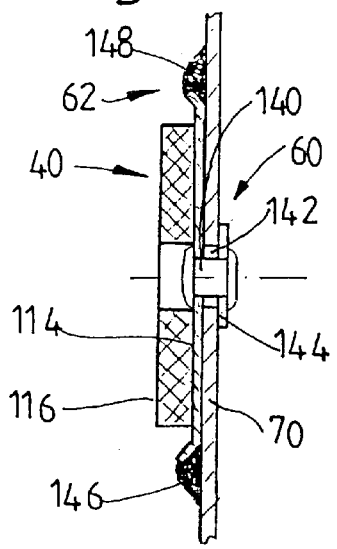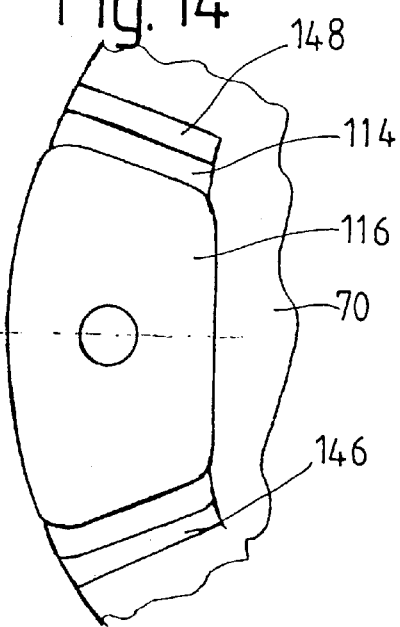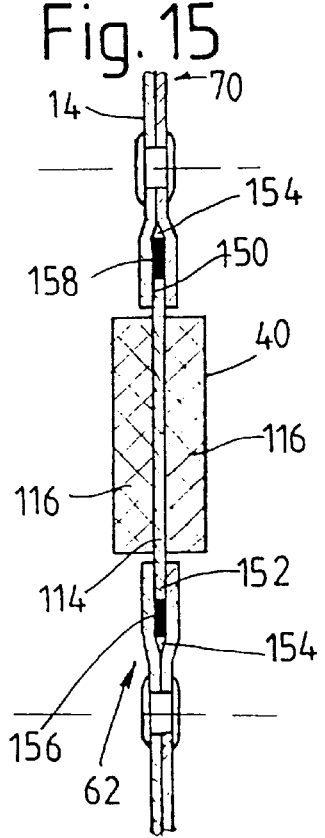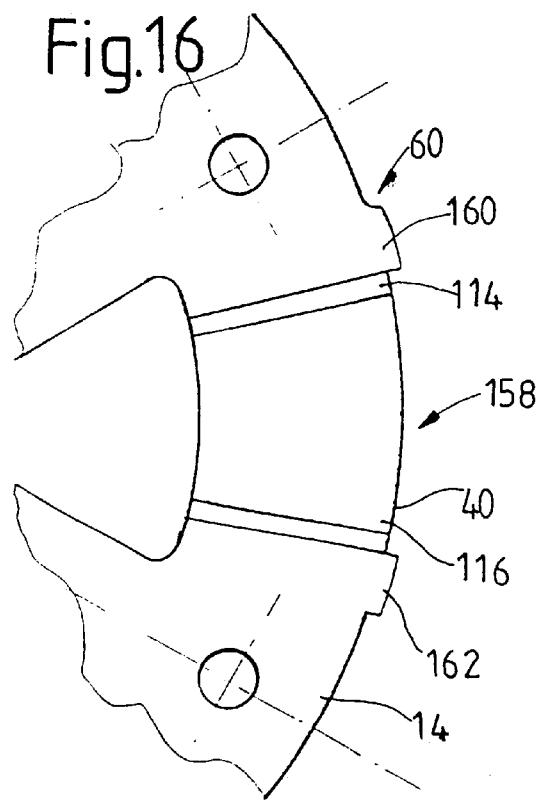

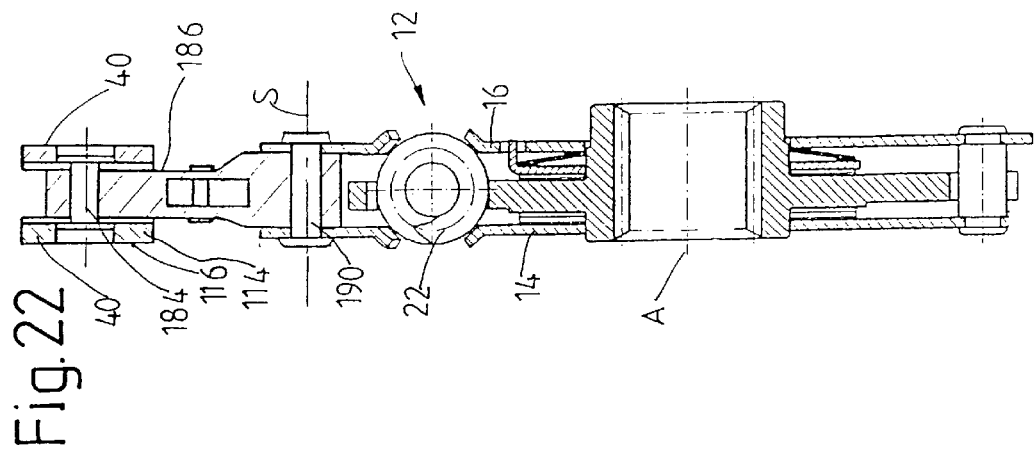
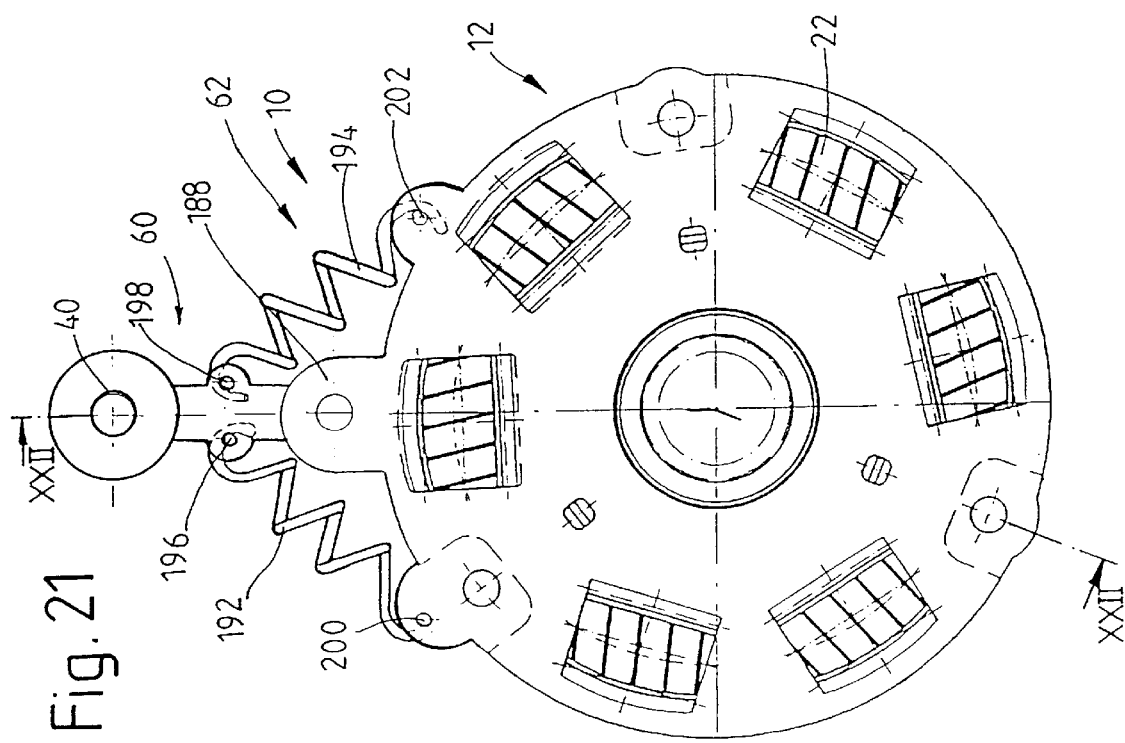

CLUTCH DISK

BACKGROUND OF THE INVENTION

1. Field of the Invention

The present invention pertains to a clutch disk, comprising a hub area and a plurality of friction lining elements carried by the hub area, following each other in the circumferential direction with respect to the rotational axis of the clutch disk, these elements providing at least part of the friction surface area, where the friction lining elements are designed to make frictional contact with the associated opposing friction surface of a flywheel, a pressure plate, or the like.

2. Description of the Related Art

In the clutch disks according to the state of the art, the friction linings are usually attached to a hub area, e.g., by way of a system of lining springs, in such a way that they can shift in the axial direction, as by way of the spring system, as the clutch is being engaged and disengaged. Other degrees of freedom for the movement of the friction linings are usually not available. This type of rigid connection of the friction linings to the hub area of a clutch disk, however, causes the problem that, as a result of local changes in, for example, the coefficient of friction or in the normal force prevailing between the friction linings and an opposing friction surface, frictional vibrations can be excited, which can lead to low-frequency noise, especially when relatively large masses are vibrating in phase with each other, to high-frequency noise (squeal), and even to the so-called "grabbing" of the clutch.

SUMMARY OF THE INVENTION

It is the object of the present invention to improve a clutch disk of the general type in question in such a way that side effects produced by the frictional vibrations which occur during slipping of the clutch can be avoided as completely as possible.

This object is accomplished according to the invention by a clutch disk comprising a hub area and a plurality of friction lining elements supported on the hub area, which are arranged in sequence around the circumference relative to the rotational axis of the clutch disk, and which provide at least part of the friction surface area, where the friction lining elements are designed to make frictional contact with the associated opposing friction surface of a flywheel, a pressure plate, or the like.

It is also provided that at least one friction lining element is supported on the hub area in such a way that it can shift position in the circumferential direction relative to the rotational axis.

In the clutch disk according to the invention, therefore, the friction lining elements or at least one of the friction lining elements can move with an additional degree of freedom, namely, that of motion in the circumferential direction. It is therefore possible for the friction lining element to shift position slightly with respect to the hub area in response to local changes in the friction conditions between a friction lining element of this type and the opposing friction surface cooperating with it; that is, an otherwise spontaneously occurring shock is absorbed, and the danger that vibrations would be induced by such a shock is therefore almost completely eliminated.

As already indicated, it can be provided that the minimum of one friction lining element is designed so that it can shift position in the circumferential direction at least in response to a change in the sliding frictional interaction between its friction lining surface and the opposing friction surface which is or can be assigned to the element.

In order to ensure that at least one friction lining element can execute a defined movement relative to the hub area especially under the action of centrifugal force, it is also possible to provide according to the invention an additional guide device for circumferential movement, by means of which the minimum of one friction lining element is guided in the circumferential direction with respect to the hub area.

A design which is especially reliable in operation and simple to construct can be obtained by using a telescoping guide device as the circumferential movement guide device. As an alternative, it is possible for the circumferential movement guide device, which is in either the minimum of one friction lining element or in the hub area, to comprise at least one guide recess, into which a corresponding guide projection of the other assembly, i.e., of either the hub area or of the friction lining element, can movably engage in the circumferential direction. It is also possible for the circumferential movement guide device to comprise at least one guide area or part on which a radially outward side of the minimum of one friction lining element or a support element carrying it can be supported.

In an alternative design of the clutch disk according to the invention, the possibility of allowing at least one friction lining element to shift in the circumferential direction relative to the rotational axis can be obtained by allowing the minimum of one friction lining element to swivel relative to the hub area around a swivel axis which is essentially parallel to the rotational axis and a certain distance away from it in the radial direction.

To ensure that, after a brief change in the frictional relationships, the previous set of kinematic and positional relationships are restored, it is also preferable to provide a restoring device for exerting pretension on the minimum of one friction lining element, which acts to hold it in a home circumferential position relative to the hub area.

This restoring device can comprise, for example, at least one spring element, which can be designed as an integral part of the hub area or of a component attached to the hub. As an alternative, it is possible for the ends of the minimum of one restoring spring element to be supported relative to the hub area and the minimum of one friction lining element.

In another design variant of the clutch disk according to the invention, the restoring function mentioned can be realized by providing the minimum of one friction lining element with at least two friction lining element parts, which are free to move relative to each other and relative to the hub area in the circumferential direction, and by allowing the restoring device to act between the minimum of two friction lining elements parts. In addition, by taking advantage of the dimensional stability properties of elastomeric materials, a restoring force can be obtained very easily by providing the restoring device with at least one area of elastomeric material in an area between the hub area and the minimum of one friction lining element or the friction lining of said element. In addition, it is possible for the restoring device to comprise at least one area of elastomeric material acting between two friction lining parts of the minimum of one friction lining element.

To take into account local changes in the frictional conditions in particular, without thus producing effects on other frictionally cooperating areas, it is proposed that it be possible for the minimum of one friction lining element or for a group of friction lining elements to move in the circumferential direction essentially independently of other friction lining elements or groups of friction lining elements.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings:

FIG. 1 is an axial view of a clutch disk according to the invention;

FIG. 2 is a cross-sectional view of the clutch disk according to the invention along line II—II of FIG. 1;

FIG. 3 is a view similar to that of FIG. 1 of an alternative design of the clutch disk according to the invention;

FIG. 4 is a cross-sectional view of the clutch disk shown in FIG. 3 along line IV—IV;

FIG. 7 is another view similar to that of FIG. 1 of an alternative design of the clutch disk according to the invention;

FIG. 8 shows a partial view of the clutch disk according to FIG. 7, looking radially from the outside;

FIG. 9 shows a cross-sectional view of the clutch disk shown in FIG. 7 along line IX—IX;

FIG. 10 shows another view similar to that of FIG. 1 of an alternative design of a clutch disk according to the invention;

FIG. 11 shows a cross-sectional view along line XI—XI of FIG. 10;

FIG. 12 shows a cross-sectional view along line XII—XII of FIG. 11;

FIG. 13 shows a partial radial view, looking from the outside in, of another alternative design of a clutch disk according to the invention;

FIG. 14 shows a partial axial view of the clutch disk shown in FIG. 13;

FIG. 15 shows a view similar to that of FIG. 13 of an additional alternative design of a clutch disk according to the invention;

FIG. 16 shows a partial axial view of the clutch disk shown in FIG. 15;

FIG. 21 shows another view similar to that of FIG. 1 of an alternative design of the clutch disk according to the invention; and FIG. 22 shows a cross-sectional view of the clutch disk shown in FIG. 21 along line XXII—XXII of FIG. 21.

DETAILED DESCRIPTION OF THE PRESENTLY PREFERRED EMBODIMENTS

Figure 6:
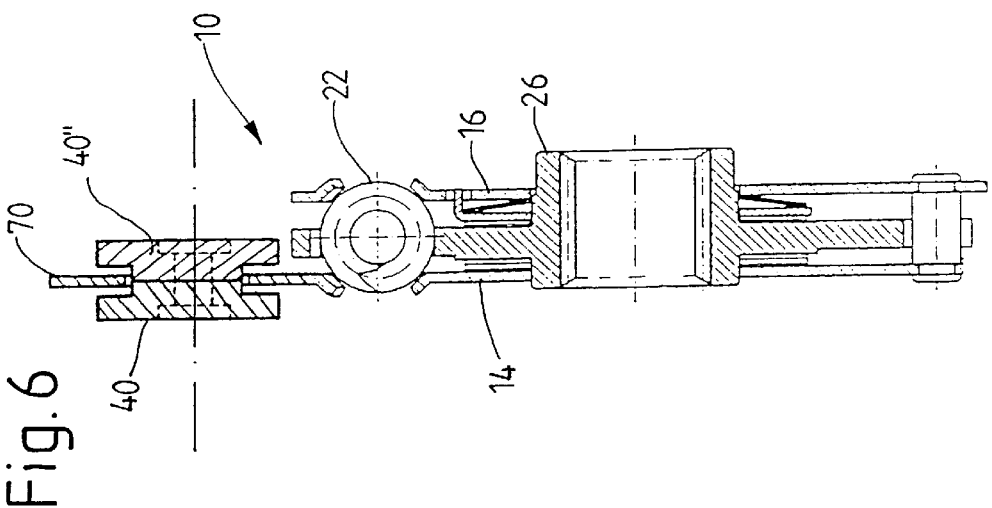
FIG. 6 is a cross-sectional view of the clutch disk shown in FIG. 5 along line VI—VI of FIG. 5.

FIGS. 1 and 2 show a first embodiment of a clutch disk 10 according to the invention. The clutch disk 10 comprises a hub area, designated 12 over-all. This area has two cover disk elements 14, 16, which are connected nonrotatably to each other and held a certain axial distance apart by a plurality of bolt elements 18. Between the two cover disk elements 14, 16 in the axial direction is a central disk element 19, which, in order to provide a torsional vibration damper 20, is supported on the cover disk elements 14, 16 by a plurality of damping springs 22. That is, when rotational irregularities occur, the cover disk elements 14, 16 can move in the circumferential direction around the rotational axis A relative to the central disk element 19 under deformation of the damping springs 22 of the torsional vibration damper 20. As a result, the rotational vibrations which occur are damped. For this purpose, furthermore, a friction damping device 24 is also provided, which acts between the cover disk elements 14, 16 and the central disk element 19. The central disk element 19 is connected nonrotatably on the radially inner side to a hub 26; the disk element can, for example, be designed as an integral part of the hub. The hub 26 is designed so that it can be connected to a power take-off shaft with no freedom to rotate but with freedom of axial movement.

The hub area 12, i.e., the cover disk elements 14, 16, have radially outward-projecting support sections 28, which have the shape of a "T" when looked at in the axial direction. As can be derived from the view in FIG. 2, the radially outer area of the support sections 28 of the cover disk elements 14, 16 are bent over toward each other to form sections 30, 32, which extend approximately in the axial direction and rest against each other to form a slide channel 34, which is open radially toward the inside. The guide sections 36, 38 of support elements 42, each of which carries at least one friction lining element 40, preferably a pair of friction lining elements 40, is introduced into this slide channel 34. Compression spring elements 48 act between the support element 42, that is, a shoulder area 44 of same, and a section 46 of the support area 28 extending essentially in the radial direction. As can be seen in FIG. 2, these springs are approximately rectangular in cross section. Their cross-sectional form thus conforms essentially to the cross-sectional form of the two T-shaped sections 50, 52 of the support area 28 extending in the circumferential direction. This results in a configuration in which two spring elements 48, acting against each other in the circumferential direction, are assigned to each support element 42 and thus to the friction lining elements 40 mounted on them, so that, in the absence of any circumferential force, the friction lining elements 40 carried on a support element 42 are ultimately pretensioned into a centered circumferential position relative to the support areas 28. When local changes occur in the frictional conditions between the friction surfaces 54 of the friction lining elements 40 and the associated opposing friction surfaces on the pressure plate or on the flywheel of a friction clutch, then the individual support elements 42, with the friction lining elements 40 carried on them, can shift position in the circumferential direction relative to the rest of the hub area 12. Local changes in the coefficient of friction, axial deflections, or bulges in the area of the opposing friction surfaces are thus unable to cause a spontaneous increase in the torque, because any such local changes can be compensated by the elastic deformation of the springs 48. The buildup of frictional vibrations and the associated vibrational phenomena can thus be avoided almost completely. In the embodiment shown in FIGS. 1 and 2, therefore, the T-shaped support areas 28 with the slide channels 34 formed in them together with the support elements 42 and their associated guide sections 50, 52 ultimately form a circumferential guide device designated 60 overall. The springs 48 assigned to the various friction lining elements 40 or pairs of elements form a restoring device designated 62 overall for the friction lining elements 40. It should be pointed out that the restoring device 62 could obviously also comprise some other type of elastically deformable elements in place of the springs 48 shown; for example, blocks of elastomeric material, against which the guide sections 36, 38 are supported during movement in the circumferential direction, could be provided inside the slide channel 34. In addition, the slide channel 34 could also be fabricated by appropriate methods to have a largely circular cross section.

An alternative design of the clutch disk according to the invention is shown in FIG. 3. Because the hub area 12 in particular is basically the same as the design described above, only the differences will be discussed below.

In the case of the embodiment according to FIGS. 3 and 4, one of the cover disk elements, e.g., cover disk element 14, is extended radially toward the outside and works together with a ring-shaped area 70 to form a support area for the friction lining elements 40. In this support area 70, window-like cutouts 72 are provided, which extend in the circumferential direction, and in which the friction lining elements 40 are held. The friction lining elements 40 consist of two parts 40', 40", which are, for example, bonded, soldered, welded, screwed, or riveted together. Each of two assembled parts 40', 40" has recesses in both circumferential ends; these recesses work together to form spring channels 74, 76. A helical compression spring 78, 80 is inserted into each of these spring channels 74, 76; the parts of these springs which project beyond their associated channel 70, 76 are supported circumferentially against the support area 70 or on guiding edges 82, 84 provided there. In addition, the assembled parts 40', 40" have groove-like recesses 86, 88, which extend in the circumferential direction on the radially inner and outer sides; the support areas 70, that is, the radially outward-extended section of the cover disk element 14, has material sections 90, 92, which extend in the circumferential direction to form the boundaries of the cutout 72; it is these sections which engage in the groove-like recesses. These groove-like recesses 86, 88 and the material sections 90, 92 which fit into them cooperate to form the circumferential motion guide device 60, whereas essentially the helical compression springs 78, 80 form the restoring device 62. In this design embodiment of a clutch disk according to the invention, therefore, the friction lining elements 40, which are held in cutouts 72 arranged in a row around the circumference, are again free to move independently of each other in the circumferential direction. It thus becomes impossible for friction to cause peak in the torque, and the buildup of frictional vibrations can be avoided almost completely. As also in the preceding design variant described above and in the embodiments to be described below, through the appropriate selection of the composition of the individual friction lining elements 40 or of the stiffness of the springs of the restoring device 62, it is possible to adapt the system to the anticipated natural frequencies responsible for exciting the frictional vibrations. The helical compression springs can again be replaced by elastic components such as elastomeric parts.

Figure 5:
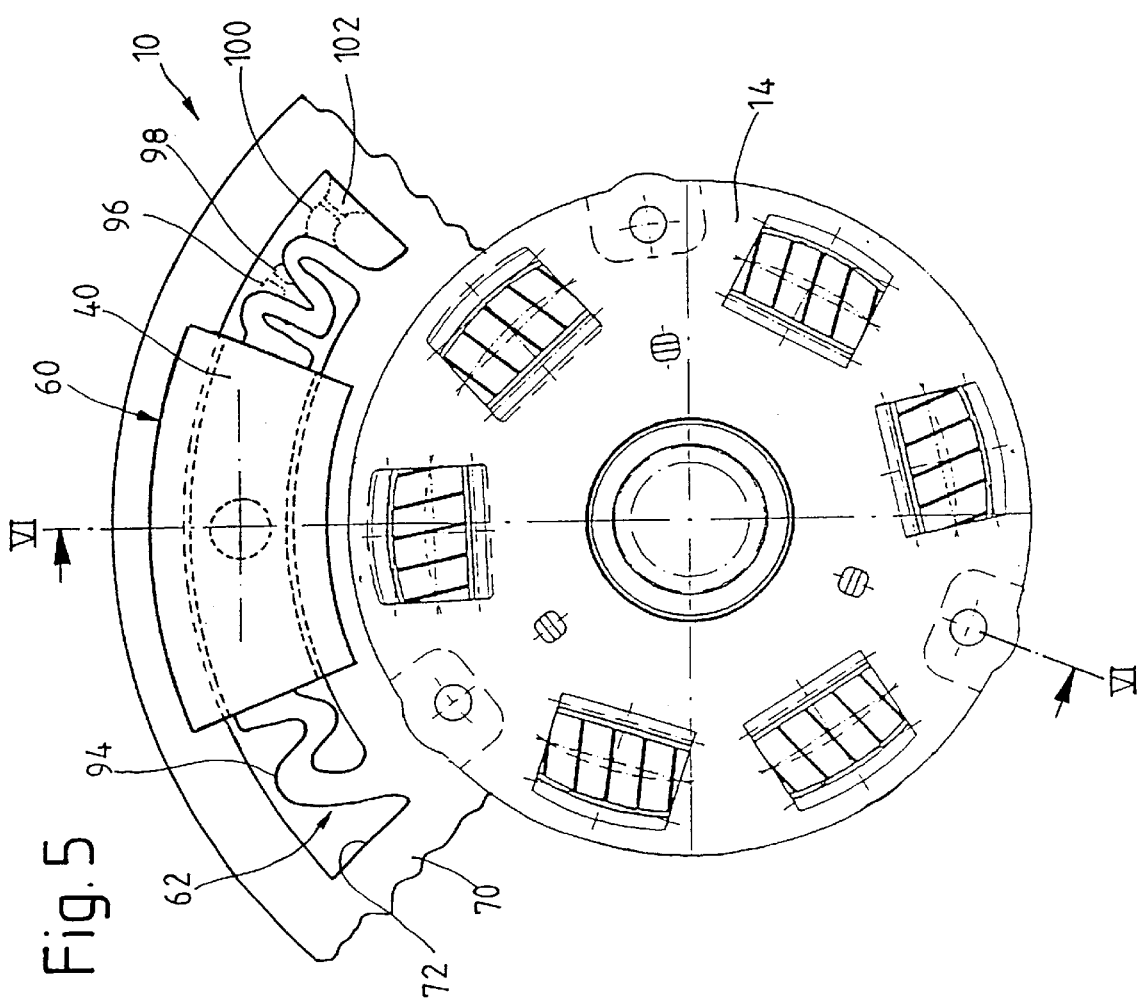
FIG. 5 is another view similar to that of FIG. 1 of an alternative design of the clutch disk according to the invention.

The embodiment of the clutch disk 10 according to the invention shown in FIGS. 5 and 6 corresponds essentially to the embodiment shown in FIGS. 3 and 4. It can be seen that here the restoring device 62 does not include separate spring elements but rather has spring sections 94, made as integral parts of the support area 70 or of cover disk element 14, these sections being, for example, in the form of windings or meanders, which are supported at their free circumferential ends against a circumferential end surface of the friction lining element 40, which is held in the recess 72. As shown on the right in FIG. 5, projections 96, 98, and 100 can be provided on the individual parts of the meander to interact with opposing projections of another section of meander or of the cover disk element 14, thus acting as stops and creating a nonlinear spring characteristic.

Another alternative embodiment of the clutch disk according to the invention is shown in FIGS. 7–9. It can be seen here that, for each friction lining element 40, a radially outward-projecting support section 104 is provided, which can be attached with rivets, for example, to the cover disk element 14. This support section 104 has two slots 106, 108, a certain radial distance apart and extending in the circumferential direction, into which the clinch bolts 110, 112 are inserted, these bolts also passing through the friction lining element 40. Here, for example, the friction lining element 40 can have a friction lining 116 carried on or mounted to a support element 114. The head parts of the clinch bolts 110, 112 fit in this case into the support element 114, whereas the heads at the other end are supported via elastic elements such as cup springs 118 against the support section 104 in order to ensure defined contact between the friction lining element 40 the support section 104 and controlled frictional damping in the tangential direction without interfering with the freedom of movement in the longitudinal direction of the slots 106, 108. It can be seen in FIG. 8 that the support element 114 has axially bent-over sections 120, 122 at its circumferential ends, against which groups of restoring springs 124, 126 are supported, the other ends of which are supported against the support section 104, i.e., in recesses, for example, provided there. The friction lining element 40, that is, especially the support element 114 of same, is pretensioned into a centered circumferential position relative to the support section 104 by these groups of restoring springs 124, 126, representing the restoring device 62.

Radially toward the outside, support is provided by an axially bent section or part 128 of the support section 104, which serves simultaneously as the circumferential motion guide device 62 for the friction lining element 40.

In this design variant, therefore, in addition to the possible displacement of a friction lining element 40 in the circumferential direction, a friction component which offers further damping of any vibrations which may occur is introduced by the clinch bolts 110, 112 (which can be replaced by threaded bolts, etc.), which shift along with the friction lining element and by the cup springs 118, which make frictional contact with the support section 104. It should also be pointed out that various modifications are possible here. For example, in place of the helical compression springs 124, 126, other types of spring elements such as blocks of elastomeric material or cup spring stacks could also be used. The support section 104 could also be made as an integral part of the cover disk element 14.

In the design variant shown in FIGS. 10–12, the friction lining elements 40 are again formed out of two essentially symmetrical parts 40', 40".

It can be seen that each of the parts 40', 40" has its own part 54', 54" to offer the friction surface which is opposed by the associated other friction surface. There is play between the two parts 40', 40" to allow circumferential movement, and each of the two parts 40', 40" forms a spring receiving area or channel 130, 132, in which, in the assembled state, a schematically suggested helical compression spring 134 or the like, which ultimately forms the restoring device 62, is inserted. In this way, the two parts 40', 40" are pretensioned away from each other in the circumferential direction, so that groove-like recesses 136, 138, formed in the circumferential ends of the parts, and which extend radially from the outside toward the inside, fit over the material sections 140, 142, which form the boundaries of the cutout 72 in the support area 70. When changes occur in the friction relationships, one of the parts 40', 40" can shift relative to other part in the circumferential direction against the force of the compression spring 134, while the other part remains supported in the circumferential direction against support area 70. It should be pointed out that, in this type of design, the same type of circumferential movement guide device as that shown in FIGS. 3 and 4 can obviously be provided also.

The design variant shown in FIGS. 10–12 allows the entire assembly to be installed very easily. In addition, different components such as the two parts 40', 40" rub against one another when displacements caused by changes in the friction relationships occur. This contributes to improved damping within the friction lining elements.

FIGS. 13 and 14 each show a friction lining element 40, in which again a friction lining 116 is permanently attached to a support element 114 by, for example, the use of an adhesive. The support element 114 is attached by a clinch bolt 140 or the like to the support area 70, which, for example, can be designed again as an integral part of the cover disk elements. In the support area 70, a slot 142 is provided, in which the clinch bolt 140 can shift in the circumferential direction. With respect to the support area 70, the clinch bolt 140 is supported by a washer 144 or the like. So that a restoring force can be produced during allowed movement in the circumferential direction, an elastomeric material 146 or 148 is provided at the two ends of the support element 114; these blocks of elastomeric material can be vulcanized, for example, both onto the support element 114 and onto the support area 70. When circumferential movement occurs, the areas of elastomeric material 146, 148 are deformed, thus producing a restoring force, which pretensions the friction lining element 40 into a centered circumferential position, that is, its home position, with respect to the rest of the hub area, which can be designed as described above for the preceding design variant. The material areas 146, 148 therefore ultimately form the restoring device 62 for the individual friction lining element 40, whereas the clinch bolt guided in circumferential slot 142 provides the circumferential movement guide device 60. To obtain defined guidance which also prevents rotation, several clinch bolts 140, offset in the radial and/or circumferential direction, can be provided here. It should be pointed out that the elastomeric materials 148, 146 obviously can also serve the function of preventing rotation.

A modified design is shown in FIGS. 15 and 16. It can be seen that the friction linings 116 are attached to both axial ends of the support element 114. The circumferential ends 150, 152 of the support element 114 project beyond the friction lining 116. The support area 70, which here, for example, can be formed by the radially outer sections of the cover disk elements 14, 16, has a recess 154, 156, formed by bending the cover disk elements 14, 16 away from each other, one of these recesses being assigned to each circumferential end 150, 152. To increase the strength, the cover disk elements 14, 16 can be riveted to each other in the circumferential direction adjacent to the associated recesses 154, 156. These two recesses 154, 156 form the boundaries of an opening 158, into which a friction lining element 40 is then inserted, so that, as can be seen in FIG. 15, the circumferential ends 150, 152 fit into the associated recesses 154, 156. The circumferential support is accomplished here by means of additional elastomeric materials, provided in the recesses 154, 156; these materials ultimately also represent the restoring device 62. Retaining sections 160, 162 of at least one of the cover disk elements 14, 16, which are bent over in the axial direction, brace the support element 114 from the radially outward position. These retaining sections 160, 162 ultimately form at the same time the circumferential movement guide device 60.

It should be pointed out here that, instead of the single support element 114, pairs of support elements 114 can obviously be inserted into the recesses 154, 156, each of these elements carrying a friction lining 116 on one side.

Figure 17:
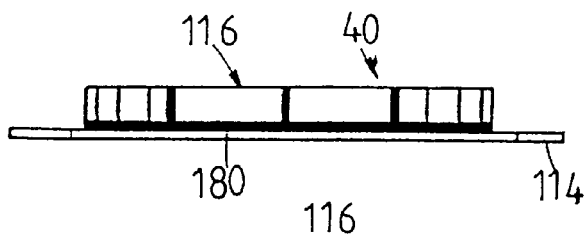
FIG. 17 shows a side view of a friction lining element for another alternative design of a clutch disk according to the invention.
Figure 18:
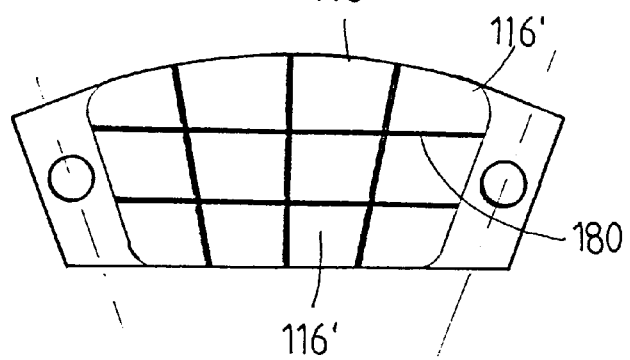
FIG. 18 shows a top or axial view of the friction lining element shown in FIG. 17.

FIGS. 17 and 18 show a design variant of a friction lining element 40, which again is attached via its support element 114 to a support area of the hub area 12, to which it can be, for example, riveted. The friction lining 116 is divided into a plurality of friction lining parts 116'. In the lattice-like or network-like intermediate spaces formed between the individual friction lining parts 116', an elastic material 180 is provided, which can also be provided between the individual friction lining parts 116' and the support element 114. This elastic material 180 can be, for example, rubber, which has been vulcanized into place, by means of which the individual friction lining parts 116' are held against each other and also by means of which these friction lining parts 116' are firmly held on the support element 114. When the friction relationships change, the individual friction lining parts 116' are able to shift with respect to the support element 114, and the individual friction lining parts 116' are also able to shift with respect to each other. This leads to energy conversion and to the damping of frictional vibrations. In addition, as a result of the attachment of the friction lining parts 116' by means of the elastomeric material 180 to the support element 114, there is no need for any other means of attachment. It should be pointed out here that a design variant of this type can also comprise a one-part friction lining 116, carried on the support element 114 by way of the elastic material layer 180.

Figure 19:
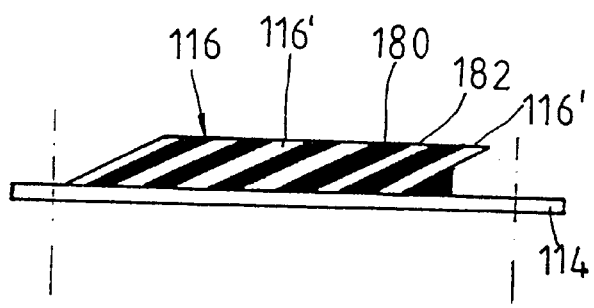
FIG. 19 shows a view similar to that of FIG. 17 of an alternative design of a friction lining element.
Figure 20:
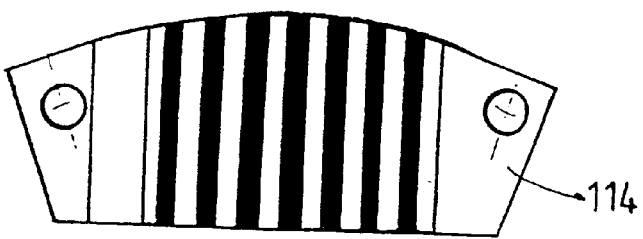
FIG. 20 shows a top or axial view of the friction lining element shown in FIG. 19.

In the case of the design variant according to FIGS. 19 and 20, the friction lining 116 is again divided into several friction lining parts 116', which now extend at an angle to the support element 114, that is, both axially away from it and also in the circumferential direction. Between these slanted friction lining parts 116' are again individual layers 180 of elastomeric material, which, for example, can again be vulcanized in place. An opposing friction surface moves in direction P across the individual axial ends 182 of the friction lining parts 116'. When the friction relationships change, elasticity in the circumferential direction is again present, which makes possible the damping of frictional vibrations. As they are moved along in the circumferential direction, the axial ends 182 of the friction lining parts 116' simultaneously approach the support element 114 as a result of their slanted orientation; i.e., the applied pressure or the normal force between the two surfaces which are rubbing against each other is reduced, which also contributes to a lessening of frictional vibrations.

In FIGS. 19 and 20, as also in the case of FIGS. 17 and 18, elastomeric material 180 can be present between the individual friction lining parts 116' and the support element 114, which then establishes the connection between them.

Another design variant of a clutch disk 10 according to the invention is shown in FIGS. 21 and 22.

In this clutch disk 10, the hub area 12 of which is essentially the same as the hub areas 12 described above, the individual friction lining elements 40, which again comprise friction linings 116 on support elements 114, are carried in pairs by way of clinch bolts 184 or the like on swivel arms 186, which are arranged in sequence around the circumference. In the radially outer area of the cover disk elements 14, 16, these swivel arms 186 are carried with freedom to swivel around a swivel axis S, which is essentially parallel to the rotational axis A. For this purpose, as can be seen in FIG. 21, the cover disk elements have radially outward-projecting connecting tabs 188, through which an axle component 190, formed by a clinch bolt, for example, passes. Two spring elements 192, 194 act between the radially central area of the swivel arms 186 and the hub area 12, one end of each spring being hooked onto the swivel arm 186, e.g., onto pin-like connecting elements 196, 198 provided there, the other ends being hooked onto corresponding elements 200, 202, which are connected to the cover disk elements 14, 16. The two springs 192, 194 act against each other and ensure that the friction lining elements 40, which are carried on a swivel arm 186, are pretensioned into a home swivel position, in which they are the greatest radial distance away from the rotational axis A. In the design variant according to FIGS. 21 and 22, the swivel arm pivotably supported on the hub area 12 simultaneously forms the circumferential movement guide device 60 for the associated friction lining elements 40, whereas the two springs 192, 194 together form the restoring device 62. When the friction relationships change, such as when there is a local increase in the coefficient of friction, the individual swivel arms 186, along with the friction lining elements 40 attached to them, are able to swivel around their swivel axis S, so that here again a certain circumferential elasticity is present in the connection between the friction lining elements 40 and the hub area 12. At the same time, the friction lining elements 40 also shift radially inward during this swiveling movement around the swivel axis S, as a result of which the average friction radius is reduced. This also contributes to a reduction in the amount of torque which can be transmitted. In place of the tension spring 192, it is also possible to provide some other type of elastic element such as compression springs or spiral springs or elastic material.

Of course, several of these friction lining elements or pairs of friction lining elements, arranged in a row around the circumference, can be supported on the hub area in such a way that, when the friction relationships change, these friction lining elements can shift either individually or in pairs, essentially independently of each other, in the circumferential direction relative to the hub area in order to absorb or to damp any frictional vibrations which may be occurring as soon as they begin, with the overall effect of reducing vibrations.

The invention is not limited by the embodiments described above which are presented as examples only but can be modified in various ways within the scope of protection defined by the appended patent claims.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A clutch disk, comprising:
   a hub area; and
   a plurality of friction lining elements supported on the hub area and arranged in sequence circumferentially relative to a clutch disk rotational axis, said lining elements providing at least a part of a clutch disk friction surface area for making frictional contact with an associated one of an opposing flywheel friction surface and a pressure plate friction surface, at least one lining element being supported on said hub area such that a position of said one lining element can shift circumferentially relative to said rotational axis, wherein said at least one lining element is shiftable circumferentially independently of any other friction lining element in the plurality of friction lining elements.

2. A clutch disk according to claim 1, wherein at least said one lining element is position shiftable responsive to a change in a sliding frictional interaction between the friction surface area of said one lining element and the opposing friction surface associated therewith.

3. A clutch disk according to claim 1, wherein said at least one lining element is swivelable relative to the hub area about a swivel axis substantially parallel to said rotational axis and radially a distance from said rotational axis.

4. The clutch disk according to claim 1, wherein a group of lining elements are supported on said hub area such that said group of lining elements are shiftable circumferentially independently of any other group of lining elements on the hub area.

5. A clutch disk according to claim 1, further comprising a circumferential movement guide for guiding movement of said at least one lining element circumferentially relative to the hub area.

6. A clutch disk according to claim 5, wherein said movement guide is a telescoping guide device.

7. A clutch disk according to claim 1, further comprising a restoring device for pretensioning said at least one lining element into a home circumferential position relative to the hub area.

8. A clutch disk according to claim 7, wherein said at least one lining element comprises at least two friction lining element parts, said lining element parts being shiftable circumferentially relative to each other and relative to the hub area, the restoring device acting between said at least two friction lining element parts.

9. The clutch disk according to claim 7, wherein the restoring device comprises at least one elastomeric material area which acts in an area between the hub area and one of said at least one lining element and a friction lining of said one lining element.

10. The clutch disk according to claim 7, wherein the restoring device comprises at least one elastomeric material area, said at least one lining element having two friction lining parts, said elastomeric material area acting between said two friction lining parts.

11. A clutch disk according to claim 7, wherein the restoring device includes at least one restoring spring element.

12. A clutch disk according to claim 11, wherein said at least one restoring spring element is an integral part of one of the hub area and a component attached to said hub area.

13. A clutch disk comprising:

a hub area a plurality of friction lining elements supported on the hub area and arranged in sequence circumferentially relative to a clutch disk rotational axis, said lining elements providing at least a part of a clutch disk friction surface area for making frictional contact with an associated one of an opposing flywheel friction surface and a pressure plate friction surface, at least one lining element being supported on said hub area such that a position of said one lining element can shift circumferentially relative to said rotational axis; and a circumferential movement guide for guiding movement of said at least one lining element circumferentially relative to the hub area, wherein said movement guide is provided in one of said at least one lining element and the hub area, said movement guide including at least one guide recess, and at least one associated guide projection on one of said hub area and said at least one lining element, respectively, circumferentially movably engageable in said guide recess.

14. A clutch disk according to claim 3, comprising:

a hub area a plurality of friction lining elements supported on the hub area and arranged in sequence circumferentially relative to a clutch disk rotational axis, said lining elements providing at least a part of a clutch disk friction surface area for making frictional contact with an associated one of an opposing flywheel friction surface and a pressure plate friction surface, at least one lining element being supported on said hub area such that a position of said one lining element can shift circumferentially relative to said rotational axis; and a circumferential movement guide for guiding movement of said at least one lining element circumferentially relative to the hub area, wherein said movement guide includes at least one guide part against which a radially outward side of one of said one lining element and a support element carrying said one lining element can be supported.

15. A clutch disk comprising:

hub area a plurality of friction lining elements supported on the hub area and arranged in sequence circumferentially relative to a clutch disk rotational axis, said lining elements providing at least a part of a clutch disk friction surface area for making frictional contact with an associated one of an opposing flywheel friction surface and a pressure plate friction surface, at least one lining element being supported on said hub area such that a position of said one lining element can shift circumferentially relative to said rotational axis; and a restoring device having at least one restoring spring element for pretensioning said at least one lining element into a home circumferential position relative to the hub area, wherein said at least one restoring spring element a first end supported against the hub area and a second end supported against said at least one lining element.

16. A friction clutch, comprising:

a clutch disk, said clutch including a hub area, and a plurality of friction lining elements supported on the hub area and arranged in sequence circumferentially relative to a clutch disk rotational axis, said lining elements providing at least a part of a clutch disk friction surface area for making frictional contact with an associated one of an opposing flywheel friction surface and a pressure plate friction surface, at least one lining element being supported on said hub area such that a position of said one lining element can shift circumferentially relative to said rotational axis, wherein said at least one lining element is shiftable circumferentially independently of any other friction lining element in the plurality of friction lining elements.

* * * * *